United States Patent [19]
Röhm

[11] Patent Number: 5,464,230
[45] Date of Patent: Nov. 7, 1995

[54] LOCKABLE DRILL CHUCK

[76] Inventor: Günter H. Röhm, Heinrich-Röhm-Strasse, 89567 Sontheim, Germany

[21] Appl. No.: 210,564

[22] Filed: Mar. 18, 1994

[30] Foreign Application Priority Data

Apr. 16, 1993 [EP] European Pat. Off. .............. 93106187

[51] Int. Cl.[6] ..................................................... B23B 31/12
[52] U.S. Cl. .............................. 279/63; 279/140; 279/902
[58] Field of Search ............................... 279/60–65, 140, 279/902

[56] References Cited

U.S. PATENT DOCUMENTS

| | | | |
|---|---|---|---|
| 4,836,563 | 6/1989 | Rohm | 279/60 |
| 5,145,192 | 9/1992 | Rohm | 279/62 |
| 5,145,193 | 9/1992 | Rohm | 279/62 |
| 5,174,588 | 12/1992 | Reibetanz et al. | 279/62 |
| 5,236,206 | 8/1993 | Rohm | 279/60 |
| 5,375,857 | 12/1994 | Rohm | 279/140 |
| 5,375,858 | 12/1994 | Rohm | 279/63 |

FOREIGN PATENT DOCUMENTS 4106129  9/1992  Germany .

Primary Examiner—Steven C. Bishop
Attorney, Agent, or Firm—Herbert Dubno; Andrew Wilford

[57] ABSTRACT

A drill chuck has a first body rotatable about an axis and formed with a plurality of angularly spaced angled guides, respective jaws slidable in the guides, and a second body axially fixed but rotatable on the first body. Interengaging screwthread formations on the second body and engaged with the jaws radially displace the jaws on the first body toward each other on forward rotation of one of the bodies relative to the other body in a tightening direction and radially displace of the jaws away from each other on opposite backward rotation of the one body relative to the other body in a loosening direction. A locking ring axially displaceable on the other body is formed with at least one tooth and the one body is formed with another tooth axially meshable with the locking-ring tooth in a front locking position of the locking ring to inhibit rotation of the bodies relative to each other. A holding ring axially fixed on the other body is rotatable thereon between angularly offset locked and unlocked positions. Interengaging cam formations on the rings displace the locking ring into the rear position on rotation of the holding ring from the locked into the unlocked position. Stops on the other body and on the holding ring are engageable with each other for limiting angular travel of the holding ring on the other body.

16 Claims, 4 Drawing Sheets

1

LOCKABLE DRILL CHUCK

FIELD OF THE INVENTION

The present invention relates to a drill chuck. More particularly this invention concerns a drill chuck that can be locked against loosening once tightened on a tool.

BACKGROUND OF THE INVENTION

A standard drill chuck has a chuck body that is normally mounted on the spindle of the drill and rotated about the axis thereof for drilling. An adjustment body normally formed as a sleeve is axially fixed but rotatable on the chuck body. One of the bodies is formed with a plurality of angularly equispaced angled guides each slidably receiving a respective jaw and teeth on these jaws mesh with a screwthread on the other body so that relative rotation of the bodies in one direction moves the jaws radially toward each other and opposite relative rotation moves them radially apart.

In order to hold the chuck in the clamping position, it is standard as described in WO 91/12,914 (U.S. equivalent U.S. Pat. No. 5,174,588) to provide a locking ring that is axially displaceable on one of the bodies and that has teeth axially meshable with teeth on the other body. A spring urges the ring axially forward to mesh the teeth together. This ring is at most limitedly rotatable on the one body so that when the teeth are engaged with each other, the bodies are locked against relative rotation. A holding ring that is rotatable on the bodies is coupled via appropriate cam formations to the locking ring so that when the locking ring is held back the holding ring can retain it in this position and thereby maintain the teeth out of mesh with each other. Thus to loosen such a chuck the locking ring is retracted and then the holding ring is turned to retain the locking ring in the retracted out-of-mesh position. The chuck is set up so that when it is tightened the holding ring is automatically rotated into the releasing position that lets the locking ring move back forward into the advanced meshed position.

Thus to operate the chuck one must separately maneuver the locking and holding rings and one of the bodies. This means that the locking and holding rings as well as one of the bodies must present sufficient surface area to grab and hold. As a result the surface of the chuck is divided into three relatively narrow bands that must be separately handled. The only way to make this construction convenient is to build the chuck relatively long, which is clearly disadvantageous in that such a tool must be fitted into confined spaces and must be as compact as possible.

OBJECTS OF THE INVENTION

It is therefore an object of the present invention to provide an improved lockable drill chuck.

Another object is the provision of such an improved lockable drill chuck which overcomes the above-given disadvantages, that is which is easy to use but which still is fairly compact.

SUMMARY OF THE INVENTION

A drill chuck has according to the invention a first body rotatable about an axis and formed with a plurality of angularly spaced angled guides, respective jaws slidable in the guides, and a second body axially fixed but rotatable on the first body. Interengaging screwthread formations on the second body and engaged with the jaws radially displace the jaws on the first body toward each other on forward rotation of one of the bodies relative to the other body in a tightening direction and radially displace of the jaws away from each other on opposite backward rotation of the one body relative to the other body in a loosening direction. A locking ring axially displaceable on the other body is formed with at least one tooth and the one body is formed with another tooth axially meshable with the locking-ring tooth in a front locking position of the locking ring to inhibit rotation of the bodies relative to each other. A spring braced between the locking ring and the other body urges the locking ring axially forward on the other body from a rear unlocked position in which the teeth are disengaged with each other toward the front locked position. A holding ring axially fixed on the other body is rotatable thereon between angularly offset locked and unlocked positions. Interengaging cam formations on the rings displace the locking ring into the rear position on rotation of the holding ring from the locked into the unlocked position. Stops on the other body and on the holding ring are engageable with each other for limiting angular travel of the holding ring on the other body.

Thus with the system of this invention one need merely manipulate the holding ring and the other body. The locking ring does not need to be touched by the user and in fact according to the invention the holding ring is formed with a sleeve extension axially overreaching the locking ring so that the locking ring is wholly covered and concealed by the holding ring.

According to another feature of the invention the holding ring and the one body together surround and extend generally a full axial length of the other body. In addition the inter-engaging cam formations include a cam and an axially open seat in which the cam engages in the locked position and unlocked positions. These cam formations form an angular guide between the rings that prevents the locking ring from moving purely axially from the unlocked to the locked position; instead it must move angularly so that accidental unlocking during violent drilling is unlikely.

The cam formations according to the invention are constructed such that the forward direction of rotation of the one body is opposite to the direction of rotation of the holding ring from the unlocked to the locked position. Furthermore these cam formations include a radially open and angularly extending groove receiving the cam and a forwardly directed cam surface formed with a central forwardly open seat in which the cam is received in the locked position of the locking ring, and a pair of angled surfaces leading forwardly and oppositely away from the seat. The cam surface is further formed with an end seat separated by one of the angled surfaces from the central seat and positioned somewhat forward from the central seat. The cam is received in the unlocked position in the end seat. In addition the cam formations include an angularly extending groove having a back face forming the cam surface and a front face directed axially back at the back face and formed opposite the central seat with a bump.

The holding ring according to the invention is formed with a sleeve extension covering and enclosing the groove. This groove can have an end forming one of the stops. Alternately the stops include a radially directed flat and a pair of angled surfaces confronting the flat and alternately engageable therewith. In addition the system can have secondary stops between the other body and the locking ring engageable with each other for limiting angular travel of the locking ring on the other body. The secondary stops are set relative to the primary stops such that the locking ring can turn on the other body through a larger angle than the holding ring can turn on the other body. The secondary stops, like the primary ones, include a radially directed flat and a pair of angled surfaces confronting the flat and alternately engageable therewith. A spring braced between the other body and the locking ring urges the locking ring in the tightening direction for self-tightening action.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
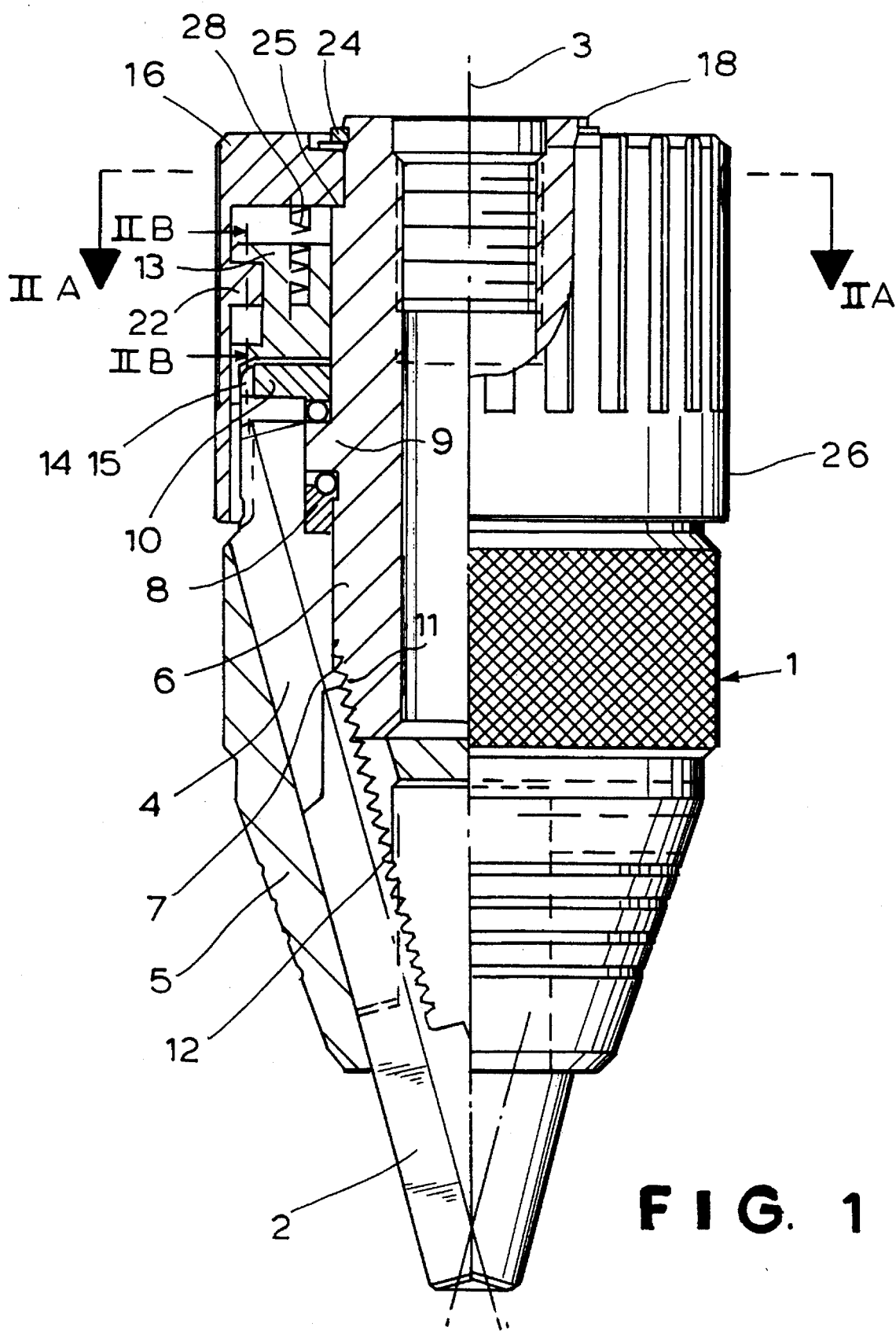
FIG. 1 is a side view partly in axial section through the chuck of this invention with the chuck in the open position.
Figure 2A:
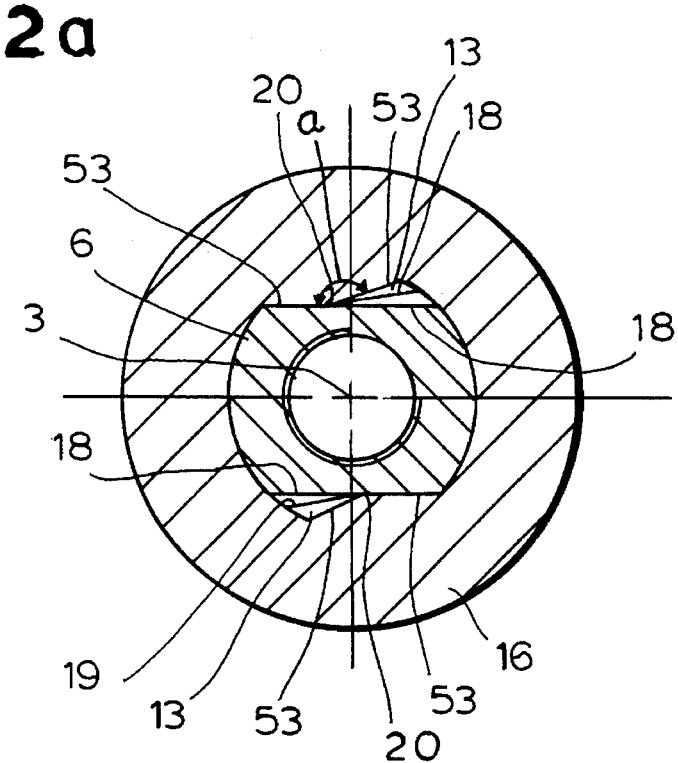
FIG. 2a is a section taken along line IIA—IIA of FIG. 1 with the chuck in the open position.
Figure 2B:
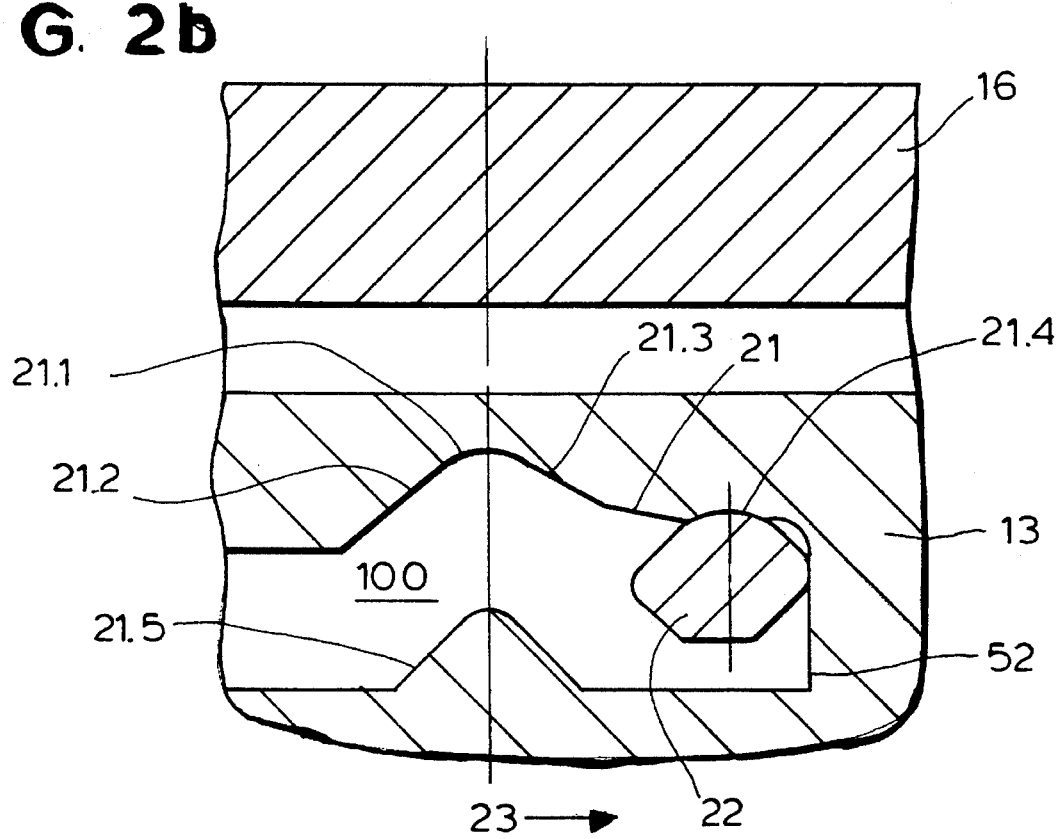
FIG. 2b is a large-scale section taken along line IIB—IIB of FIG. 1.

As seen in FIGS. 1, 2a, and 2b, a self-tightening chuck 1 according to this invention has a body 6 normally mounted on a hammer-drill spindle and adapted to be rotated about its center axis 3 thereby. An adjustment sleeve 5 rotatable on the body 6 is formed with angled guide passages 4 receiving jaws 2 having toothed inner edges 12 that mesh with a screwthread 7 formed on a frustoconical front end 11 of the body 6. The body 6 has a radially outwardly projecting ridge 9 braced by bearing balls 8 axially forwardly against the sleeve 5 and axially backward against an annular washer 10 fixed to the sleeve 5. Thus, as is standard, rotation of the sleeve 5 in a direction 23 (see FIG. 2b) will cause the jaws 2 to move radially together and opposite rotation will separate them. Of course it would also be possible to form the guides 4 in the body 1 and to provide the screwthread 11 on the sleeve 5 for identical operation.

A locking ring 13 limitedly axially displaceable on the body 1 is formed with forwardly directed teeth 14 that can mesh with teeth 15 formed on the ring 10 fixed to the sleeve 5. The ring 13 is moved axially by a holding ring or sleeve 16 that is axially fixed between a snap ring 24 and a shoulder 25 of the body 6 so that this ring 16 can rotate limitedly on the body 6 but not move axially thereon. Springs 28 urge the ring 13 forward into the meshed or coupling position and angularly in the tightening direction 23, so that these springs 28 also have a self-tightening function.

The body 6 as seen in FIG. 2a is formed with a pair of planar and parallel flat surfaces 18 that are directed diametrically opposite each other and that extend parallel to the axis 3. The locking ring 13 is formed at each face 18 with a pair of angled flat faces 19 that meet at a point 20 and that extend at a large obtuse angle a to each other. The difference between 180° and the angle a is how much the locking ring 13 can pivot about the axis 3 on the body 6.

In turn as further shown in FIG. 2a the holding ring 16 is formed directly above each pair of surfaces 19 with a similar such pair of surfaces 53 that extend at an obtuse angle somewhat smaller than the angle a to each other. Thus the amount of pivoting of the holding ring 16 on the body 6 is somewhat more than the pivoting of the locking ring 13 on the body 6. The difference between the angular travel of the ring 13 and that of the ring 16 accounts for the slack that can be taken up by self-tightening action as described below.

As better seen in FIG. 2b the holding sleeve 16 is formed with a plurality of radially inwardly projecting cam-follower formations or bumps 22 (only one illustrated) that each engage a respective cam 21 formed as the back surface of a radially outwardly open pocket 100 formed in the sleeve 13. This cam surface 21 has a central seat 21.1 in which the respective cam 22 fits when the ring 13 is shifted forward to mesh the teeth 14 and 15 with each other in the locked position. Ramps or angled surfaces 21.2 and 21.3 extend forwardly from either side of the seat 21.1 and are angled such that as the respective cam 22 moves along them the teeth 14 are pulled back out of engagement with the teeth 15. Each cam surface 21.3 ends at another seat 21.4 in which the respective cam 22 can lodge to retain the locking ring 13 in the pulled-back unlocked position. The opposite face of each pocket 100 is formed with an actuating cam surface or bump 21.5 that forces the respective cam 22 to ride along the cam surface 21, making it impossible for the ring 13 to shift between the retaining and holding positions without rotating. (It is of course possible to form the cam pocket 100 on the ring 16 and the cam bumps 22 on the ring 13 for the same effect.)

Rotation of the holding ring 16 relative to the body 6 in both directions is limited in part by an end surface 52 of each pocket 100. This limit is only effective when the locking ring 13 is blocked by the surfaces 19 at the end of its angular travel on the body 6. To avoid this dependence on the position of the ring 13, the surfaces 53 limit the angular travel of the ring 16.

The rotation direction of the holding ring 16 to shift the locking ring into the locking position with the teeth 14 and 15 meshing is opposite to the rotation direction of the sleeve 5 on closing or tightening of the chuck 1. Thus if the holding ring 16 is turned to release the sleeve 5 from the locking ring 13, this action insures that the locking ring 13 is in one of its end positions that permits tightening of the chuck and from which the locking ring can be displaced into its opposite end position in which its further rotation and thus the self-tightening action is ended.

The system described above operates as follows:

Starting with the open position of FIGS. 2a and 2b, the chuck is closed, that is its jaws 2 are moved radially toward each other, by holding the ring 16 and rotating the adjustment sleeve 5 in the closing direction 23 relative to the stationary ring 16. To start with the interengagement of the teeth 14 and 15 entrains the sleeve 5 which, as it rotates, screws the jaws 2 down on the screwthread 7, bringing them together. Once the jaws 2 seat on the bit or workpiece being chucked, the body 6 is entrained also, whereupon the ring 13 is also rotated until the cam 22 moves into the seat 21.1 and the adjustment ring 5 is coupled to the locking ring 13, that is the teeth 14 and 15 mesh and the structure is in the position of FIGS. 3a and 3b.

Figure 4A:
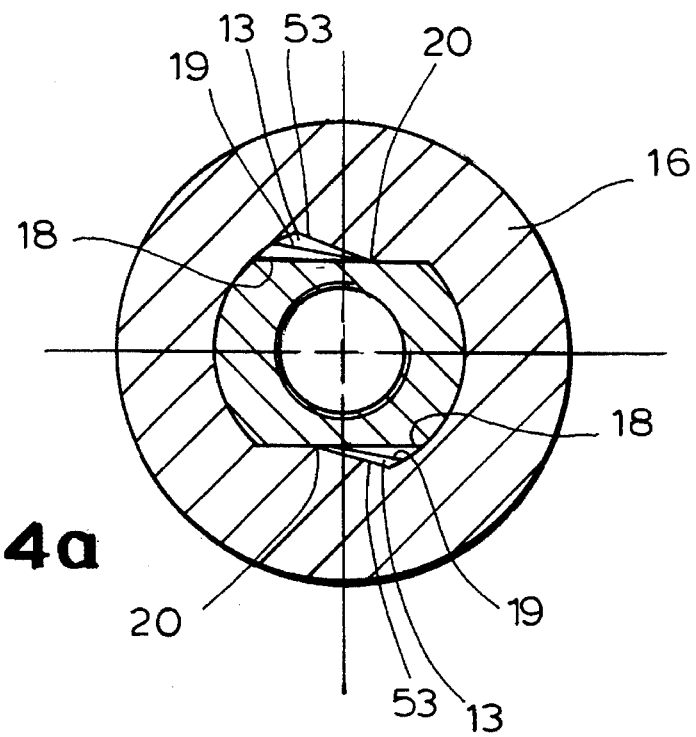
FIGS. 4a and 4b are further views like respective FIGS. 2a and 2b but with the chuck in the closed and fully tightened positioned.
Figure 4B:
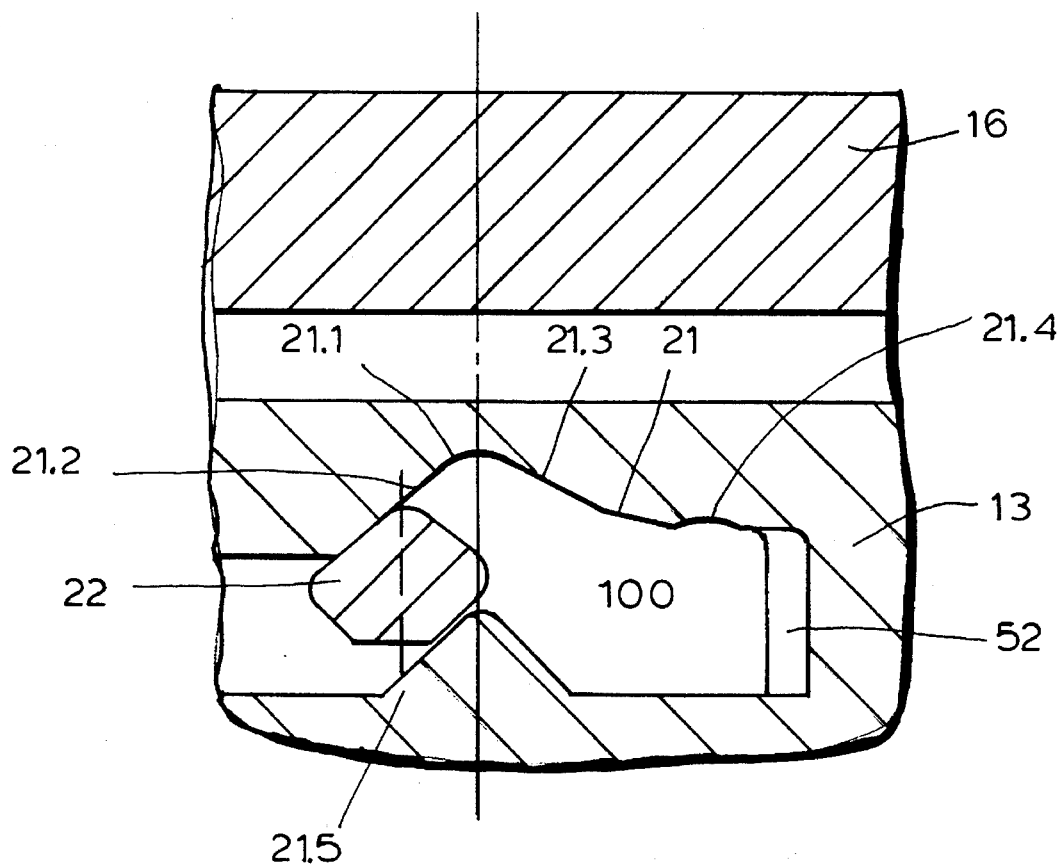

Thereafter the adjustment sleeve 5 and holding ring 16 are both turned further in the direction 23 until the surfaces 53 flatly abut the surfaces 18 and the position of FIGS. 4a and 4b is assumed. In this position further rotation of the chuck body 6 relative to the holding ring 16 is impossible. In addition however the ramp 21.2 has lifted the locking ring 13 out of the locking position so that the sleeve 5 can be rotated on the body 6 with maximum force to get the tool or workpiece very tight. When the sleeve 16 is then released, its spring 28 pushes it back into the locked position of FIG.

Figure 3A:
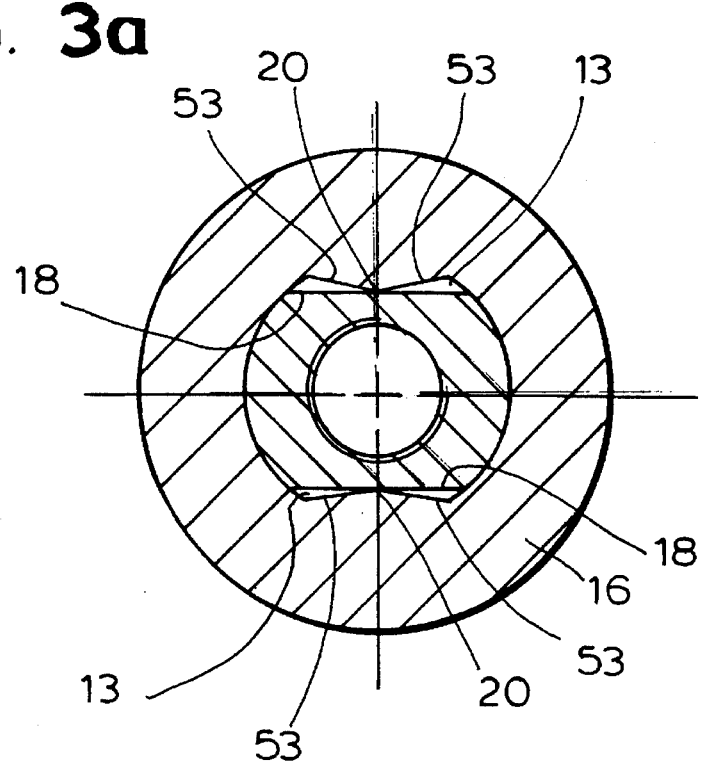
FIGS. 3a and 3b are views like respective FIGS. 2a and 2b but with the chuck in the closed but not tight position.
Figure 3B:
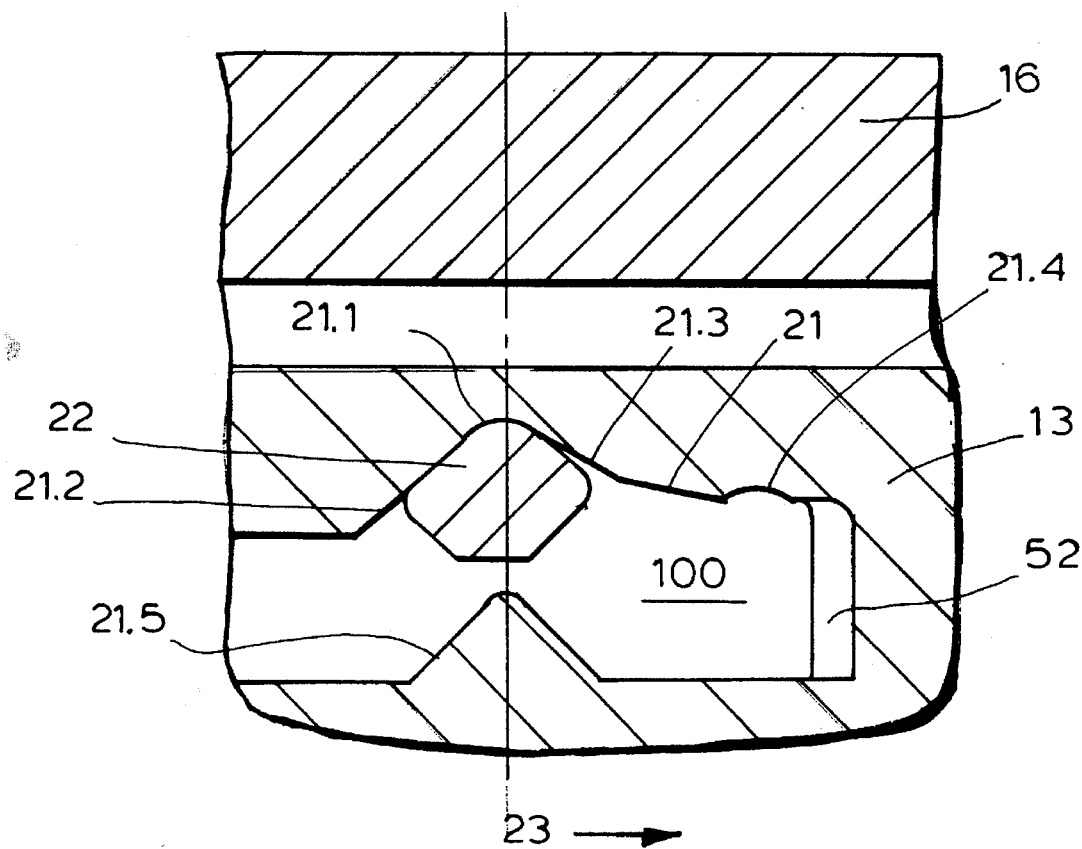

3b while simultaneously the cam 22 moving on the surface 21.2 moves the holding ring 16 into the position of FIG. 3a.

With this system the user need merely have access to the holding sleeve 16 to tighten or loosen the chuck. He or she does not have to manipulate the locking ring 13 at all. Thus the ring 16 is provided with a sleeve extension 26 which projects axially forward from it to cover the locking ring 13 and cam system completely. The chuck body 6 itself is completely encased in the chuck so that all that is really accessible from outside are the relatively long holding ring 16 and tightening sleeve 5, which are the only parts the user has to touch to operate the chuck 1.

I claim:

1. A drill chuck comprising:

a first body rotatable about an axis and formed with a plurality of angularly spaced angled guides;

respective jaws slidable in the guides;

a second body axially fixed but rotatable on the first body;

means including interengaging screwthread formations on the second body and engaged with the jaws for radial displacement of the jaws on the first body toward each other on forward rotation of one of the bodies relative to the other body in a tightening direction and for radial displacement of the jaws away from each other on opposite backward rotation of the one body relative to the other body in a loosening direction;

a locking ring axially displaceable on the other body and formed with at least one tooth, the one body being formed with another tooth axially meshable with the locking-ring tooth in a front locking position of the locking ring to inhibit rotation of the bodies relative to each other;

a spring braced between the locking ring and the other body urging the locking ring axially forward on the other body from a rear unlocked position in which the teeth are disengaged with each other toward the front locked position;

a holding ring axially fixed on the other body and rotatable thereon between angularly offset locked and unlocked positions;

means including interengaging cam formations on the rings for displacing the locking ring into the rear position on rotation of the holding ring from the locked into the unlocked position, the cam formations including a forwardly directed cam surface formed with
a central forwardly open seat in which the cam is received in the locked position of the locking ring, and
a pair of angled surfaces leading forwardly and oppositely away from the seat; and means including primary stops on the other body and on the holding ring engageable with each other for limiting angular travel of the holding ring on the other body.

2. The drill chuck defined in claim 1 wherein the holding ring is formed with a sleeve extension axially overreaching the locking ring, whereby the locking ring is wholly covered and concealed by the holding ring.

3. The drill chuck defined in claim 2 wherein the holding ring and the one body together surround and extend generally a full axial length of the other body.

4. The drill chuck defined in claim 1 wherein the interengaging cam formations include a cam and an axially open seat in which the cam engages in the locked position.

5. The drill chuck defined in claim 4 wherein the interengaging cam formations include a cam and an axially open seat in which the cam engages in the unlocked position.

6. The drill chuck defined in claim 1 wherein the cam formations form an angular guide between the rings.

7. The drill chuck defined in claim 6 wherein the cam formations are constructed such that the forward direction of rotation of the one body is opposite to the direction of rotation of the holding ring from the unlocked to the locked position.

8. The drill chuck defined in claim 6 wherein the cam formations include a radially open and angularly extending groove receiving the cam.

9. The drill chuck defined in claim 1 wherein the cam surface is further formed with an end seat separated by one of the angled surfaces from the central seat and positioned somewhat forward from the central seat, the cam being received in the unlocked position in the end seat.

10. The drill chuck defined in claim 1 wherein the cam formations include an angularly extending groove having a back face forming the cam surface and a front face directed axially back at the back face and formed opposite the central seat with a bump.

11. The drill chuck defined in claim 10 wherein the holding ring is formed with a sleeve extension covering and enclosing the groove.

12. The drill chuck defined in claim 10 wherein the groove has an end forming one of the stops.

13. The drill chuck defined in claim 1 wherein the stops include a radially directed flat and a pair of angled surfaces confronting the flat and alternately engageable therewith.

14. The drill chuck defined in claim 1, further comprising means including secondary stops between the other body and the locking ring engageable with each other for limiting angular travel of the locking ring on the other body, the secondary stops being set relative to the primary stops such that the locking ring can turn on the other body through a larger angle than the holding ring can turn on the other body.

15. The drill chuck defined in claim 1 wherein the secondary stops include a radially directed flat and a pair of angled surfaces confronting the flat and alternately engageable therewith.

16. The drill chuck defined in claim 1, further comprising a spring braced between the other body and the locking ring and urging the locking ring in the tightening direction.

\* \* \* \* \*